(12) United States Patent
Kogure

(10) Patent No.: US 9,533,634 B2
(45) Date of Patent: Jan. 3, 2017

(54) POWER FEEDING STRUCTURE FOR SLIDING DOOR

(71) Applicant: Yazaki Corporation, Tokyo (JP)

(72) Inventor: Naoto Kogure, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 15/014,529

(22) Filed: Feb. 3, 2016

(65) Prior Publication Data

US 2016/0144809 A1 May 26, 2016

Related U.S. Application Data

(63) Continuation of application No. PCT/JP2014/072923, filed on Sep. 1, 2014.

(30) Foreign Application Priority Data

Sep. 6, 2013 (JP) ................................. 2013-184983

(51) Int. Cl.

| | |
|---|---|
| *B60R 16/02* | (2006.01) |
| *B60R 16/027* | (2006.01) |
| *B60J 5/04* | (2006.01) |
| *B60J 5/06* | (2006.01) |
| *H02G 11/00* | (2006.01) |

(52) U.S. Cl.

CPC ............ *B60R 16/0215* (2013.01); *B60J 5/047* (2013.01); *B60J 5/06* (2013.01); *B60R 16/027* (2013.01); *H02G 11/00* (2013.01)

(58) Field of Classification Search

CPC ............ B60J 5/06; B60J 5/047; B60R 16/027; B60R 16/0215

USPC ......................................................... 296/155
See application file for complete search history.

(56) References Cited

U.S. PATENT DOCUMENTS 7,284,785 B2* 10/2007 Gotou .................. H02G 3/0475
174/72 A
8,070,212 B2* 12/2011 Shima ................. B60R 16/0207
296/146.9
2002/0151213 A1 10/2002 Aoki et al.
(Continued)

FOREIGN PATENT DOCUMENTS

| JP | 2005-008010 A | 1/2005 |
|---|---|---|
| JP | 2007-151377 A | 6/2007 |
| WO | WO-2013/094550 A1 | 6/2013 |

OTHER PUBLICATIONS

International Search Report mailed Oct. 7, 2014, issued for PCT/JP2014/072923.

*Primary Examiner* — Jason S Morrow
(74) *Attorney, Agent, or Firm* — Locke Lord LLP

(57) ABSTRACT

Provided is a power feeding structure for a sliding door, in which the wire harness is routed from a swinging member placed near a rear portion of a vehicle body-side step portion to a sliding door-side swinging member through an opening behind the step portion, and a forward turning angle of the vehicle body-side swinging member is restricted so that the wire harness forms a projection which projects from the vehicle body-side swinging member toward an outer side of the vehicle than the step portion and a curved portion which projects in a convex form outward of the vehicle when the sliding door is slid forward of a vehicle and is fully closed. When the sliding door is fully closed, the sliding door-side swinging member is biased inward of the vehicle by a spring member.

3 Claims, 4 Drawing Sheets

(56) References Cited

U.S. PATENT DOCUMENTS

| | | | | |
|---|---|---|---|---|
| 2005/0264033 A1* | 12/2005 | Aoki | ................... | B60R 16/0215 |
| | | | | 296/155 |
| 2014/0299370 A1* | 10/2014 | Ikeda | ................... | B60R 16/027 |
| | | | | 174/72 A |
| 2015/0102182 A1* | 4/2015 | Sekino | ................ | B60R 16/0215 |
| | | | | 248/70 |
| 2015/0203057 A1* | 7/2015 | Terada | ................... | H02G 11/00 |
| | | | | 248/70 |

* cited by examiner

POWER FEEDING STRUCTURE FOR SLIDING DOOR

TECHNICAL FIELD

The present invention relates to a power feeding structure for a sliding door for wiring or routing a wire harness using a swinging member to always feed power from a vehicle body to a sliding door.

BACKGROUND ART

To always feed power from a vehicle body (power supply side) to a sliding door, various power feeding structures for a sliding door are conventionally proposed.

For example, Patent Literature 1 (not shown) describes that a fixing member having a substantially U-shaped vertical cross section is fixed to a sliding door, a swinging member is pivotally supported on the fixing member such that the swinging member can swing in the horizontal direction, a harness fixing tool is fixed to a vehicle body, a corrugated tube of a wire harness is wired or routed from the swinging member to the harness fixing tool, an electric wire portion of the wire harness is inserted into the corrugated tube from the harness fixing tool, and the swinging member and the fixing member are routed on the side of the sliding door. The corrugated tube bends between the swinging member and the harness fixing tool when the sliding door is fully opened, and the corrugated tube straightly extends between the swinging member and the harness fixing tool when the sliding door is fully closed.

Patent Literature 2 (not shown) describes that a vehicle body-side harness fixing member is composed of a base and a cover which can be divided in the vertical direction, and a turning body provided on an inner side of the base and the cover such that the turning body can turn in a circumferential direction, right and left guide walls are provided in an opening of the cover, and a wire harness is inserted into the turning body and is bent along the guide walls.

A harness surplus length-absorbing device is provided on the side of a sliding door, a wire harness is routed from the vehicle body-side harness fixing member to the harness surplus length-absorbing device, the wire harness bends between the harness fixing member and the harness surplus length-absorbing device when the sliding door is fully opened, and the wire harness straightly extends between the harness fixing member and the harness surplus length-absorbing device when the sliding door is fully closed.

CITATION LIST

Patent Literatures

Patent Literature 1: JP 2007-151377 (FIGS. 1 to 2)
Patent Literature 2: JP 2005-8010 (FIGS. 1 to 6)

SUMMARY OF INVENTION

Technical Problem

In the conventional power feeding structure for a sliding door, however, as shown in an example of a similar structure in FIGS. 6 to 8 for example, a corrugated tube 63 of a wire harness 62 is straightly routed from a vehicle body-side power feeding tool swinging member 31 to a sliding door-side power feeding tool swinging member 64 when a sliding door 2 is fully closed as shown by solid lines on the right side in FIG. 6 (left side in FIG. 7). Therefore, a portion of the corrugated tube 63 shown by a reference sign 63a is exposed upward from a rear portion of a horizontal step portion 6 of a platform of a vehicle body 5, and the exposed portion 63a of the corrugated tube 63 can be seen from a passenger room on an inner side of the vehicle than a door trim 8 of the sliding door. Hence, there is concern that visual quality (outward appearance quality) on the side of the passenger room is deteriorated.

Further, as shown in FIGS. 7 and 8, a corrugated tube pulling-out opening 32 must be formed widely (W2) in vertical rear panels 14a and 14b of the step portion 6 of the vehicle body 5, strength of the step portion 6 is deteriorated, a front portion 32a of the opening 32 can be seen from outside of the vehicle and there is concern that visual quality is deteriorated.

Furthermore, as shown in FIGS. 6 and 7, since the corrugated tube 63 straightly extends when the sliding door 2 is fully closed, the corrugated tube 63 is compressed in its axial direction when the sliding door 2 is fully closed (when sliding door 2 is halfway opened), the corrugated tube 63 is bent outward or inward of the vehicle, a bending locus of the corrugated tube 63 does not become constant, the corrugated tube 63 is prone to be buckled or caught and there is concern that bending endurance of the corrugated tube 63 and opening operability of the sliding door 2 may be deteriorated.

These concerns may be generated even if other harness protection tube or a caterpillar-shaped exterior member is used instead of the corrugated tube 63 (see Patent Literature 2 for caterpillar-shaped exterior member).

In view of the above-described points, it is an object of the present invention to provide a power feeding structure for a sliding door capable of eliminate deterioration of visual quality caused by exposure of a vehicle body-side wire harness when the sliding door is fully closed, and capable of smoothly bending the wire harness from the instant when the sliding door is fully closed to the instant when the sliding door is fully opened.

Solution to Problem

To achieve the above object, a first aspect of the present invention provides a power feeding structure for a sliding door wherein a wire harness is routed from a swinging member placed near a rear portion of a vehicle body-side step portion to a sliding door-side swinging member through an opening behind the step portion, and a forward turning angle of the vehicle body-side swinging member is restricted so that the wire harness forms a projection which projects from the vehicle body-side swinging member toward an outer side of the vehicle than the step portion and a curved portion which projects in a convex form outward of the vehicle when the sliding door is slid forward of a vehicle and is fully closed.

According to the above configuration, when the sliding door is fully closed, the wire harness is pulled forward between the sliding door-side swinging member around the vehicle body-side swinging member as a fulcrum and in this state, the wire harness is routed on the outer side of the vehicle (on the side of sliding door) of the step portion without becoming caught on the step portion of the platform from the vehicle body-side swinging member. Therefore, when the step portion is viewed from inside of the vehicle, the wire harness is not seen and visual quality is enhanced. At the same time, a forward turning angle of the vehicle body-side swinging member is restricted to a smaller value than a conventional turning angle. According to this, a rear opening of the step portion is formed narrow in the longitudinal direction (front end of opening is placed rearward as compared with conventional technique), the opening cannot be seen from outside of the vehicle when the sliding door is opened, and this configuration also enhances the visual quality.

The power feeding structure for a sliding door according to a second aspect is characterized in that, in the power feeding structure for a sliding door according to the first aspect, when the sliding door is fully closed, the sliding door-side swinging member is biased inward of the vehicle by a spring member.

According to the above configuration, when the sliding door is opened from the fully closed state, the sliding door-side swinging member and the wire harness portion which is pulled out from the sliding door-side swinging member are turned and biased by the spring member in the forward direction of the vehicle, and the sliding door-side swinging member and the wire harness portion which is pulled out from the sliding door-side swinging member are always turned and biased forward or outward of the vehicle when the sliding door is fully opened. According to this, a bending locus of the wire harness during the opening operation of the sliding door is always smoothly secured constant without reversely warping, and the bending endurance of the wire harness is enhanced. The same working effect is exhibited by reversing the operation also when the sliding door is fully closed from its fully opened state.

The power feeding structure for a sliding door according to a third aspect is characterized in that, in the power feeding structure for a sliding door according to the second aspect, when the sliding door is fully closed, the wire harness is bent substantially in S shape between the vehicle body-side swinging member and the sliding door-side swinging member.

According to the above configuration, the wire harness is routed with sufficient length margin when the sliding door is fully closed, the length of the wire harness when the sliding door is fully opened is set long correspondingly, the wire harness is bent forward of the vehicle from the vehicle body-side swinging member when the sliding door is fully opened, and interference between the wire harness and the vehicle body portion behind the step portion is prevented. This operation is reliably carried out by biasing the sliding door-side swinging member by the spring member. By bending the wire harness into the substantially S-shape when the sliding door is fully closed, a surplus length of the wire harness when the sliding door is fully opened is absorbed.

Advantageous Effects of Invention

According to the invention of the first aspect, since the wire harness is not exposed on an upper side of the step portion of the vehicle body when the sliding door is fully closed, visual quality from inside of the vehicle is enhanced, a front portion of the opening behind the step portion is retreated as compared with the conventional technique and the opening is formed narrowly. Therefore, visual quality from outside of the vehicle is enhanced and accordingly, quality of inward appearance and outward appearance of the vehicle are enhanced.

According to the invention of the second aspect, since a turning and biasing direction of the vehicle body-side swinging member caused by the spring member is constant when the sliding door is fully opened from the fully closed state, a bending locus of the wire harness is always smoothly maintained constant without reversely warping, and the bending endurance of the wire harness is enhanced.

According to the invention of the third aspect, the wire harness is routed with length margin when the sliding door is fully closed, the wire harness is bent forward of the vehicle when the sliding door is fully opened, and it is possible to prevent interference between the wire harness and the vehicle body portion behind the step portion.

DESCRIPTION OF EMBODIMENTS

Figure 1:
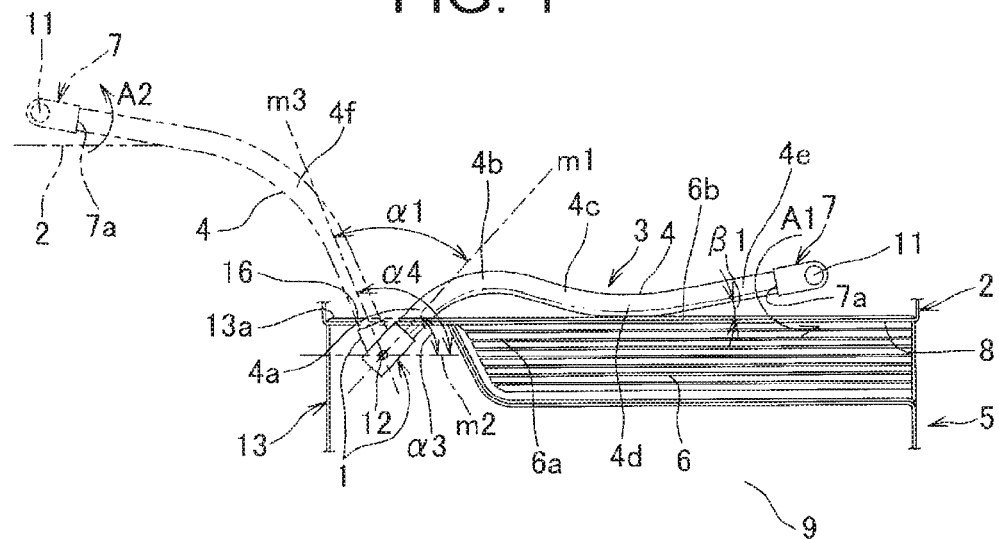
FIG. 1 is a plan view showing one example of a power feeding structure for a sliding door according to the present invention.
Figure 2:
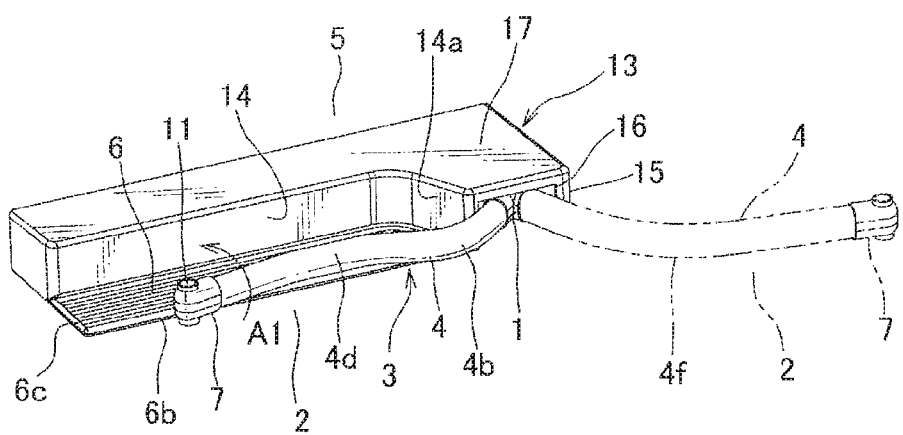
FIG. 2 is a perspective view of the power feeding structure for a sliding door as viewed from outside of a vehicle.
Figure 3:
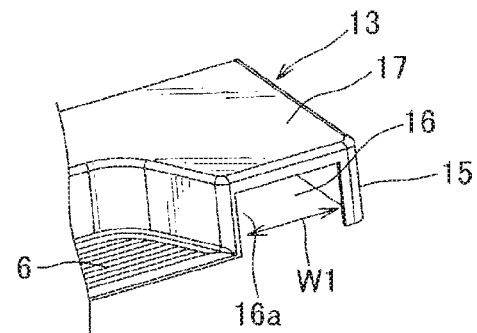
FIG. 3 is a perspective view showing a configuration of a vehicle body-side harness pulling-out portion.
Figure 4:
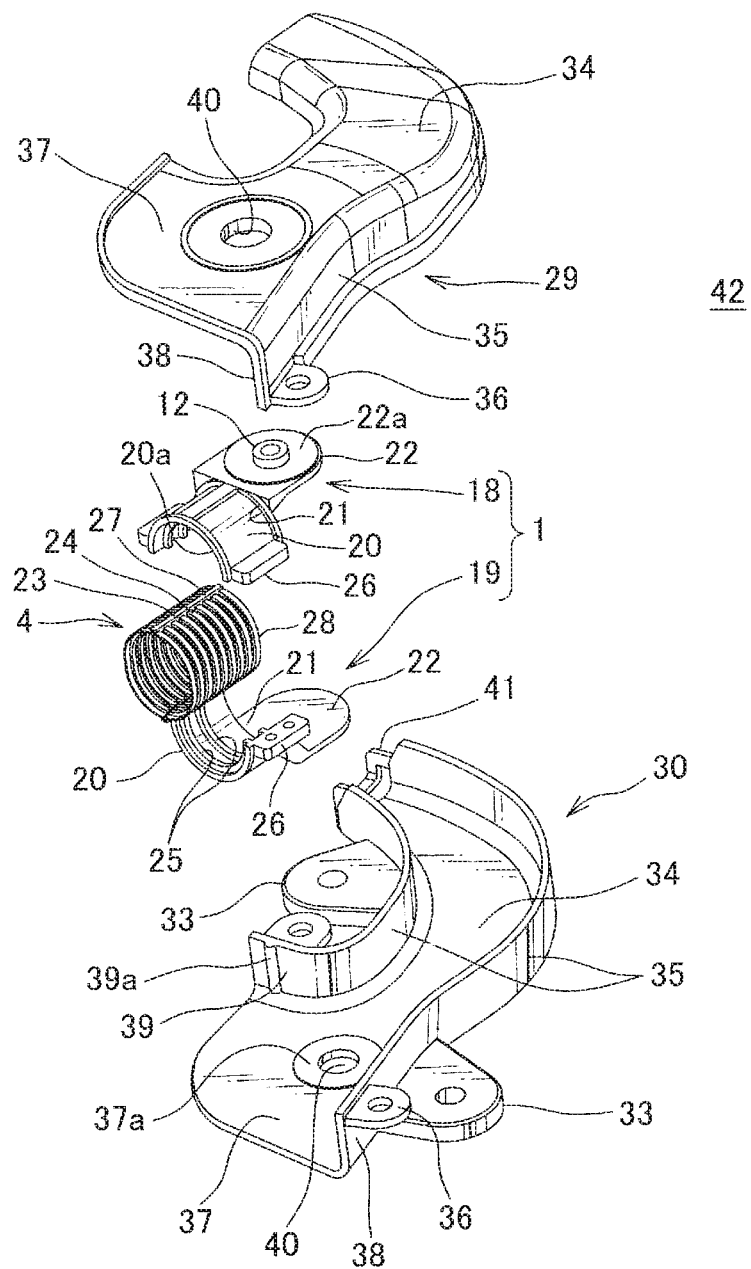
FIG. 4 is an exploded perspective view showing one example of a vehicle body-side power feeding tool.
Figure 5:
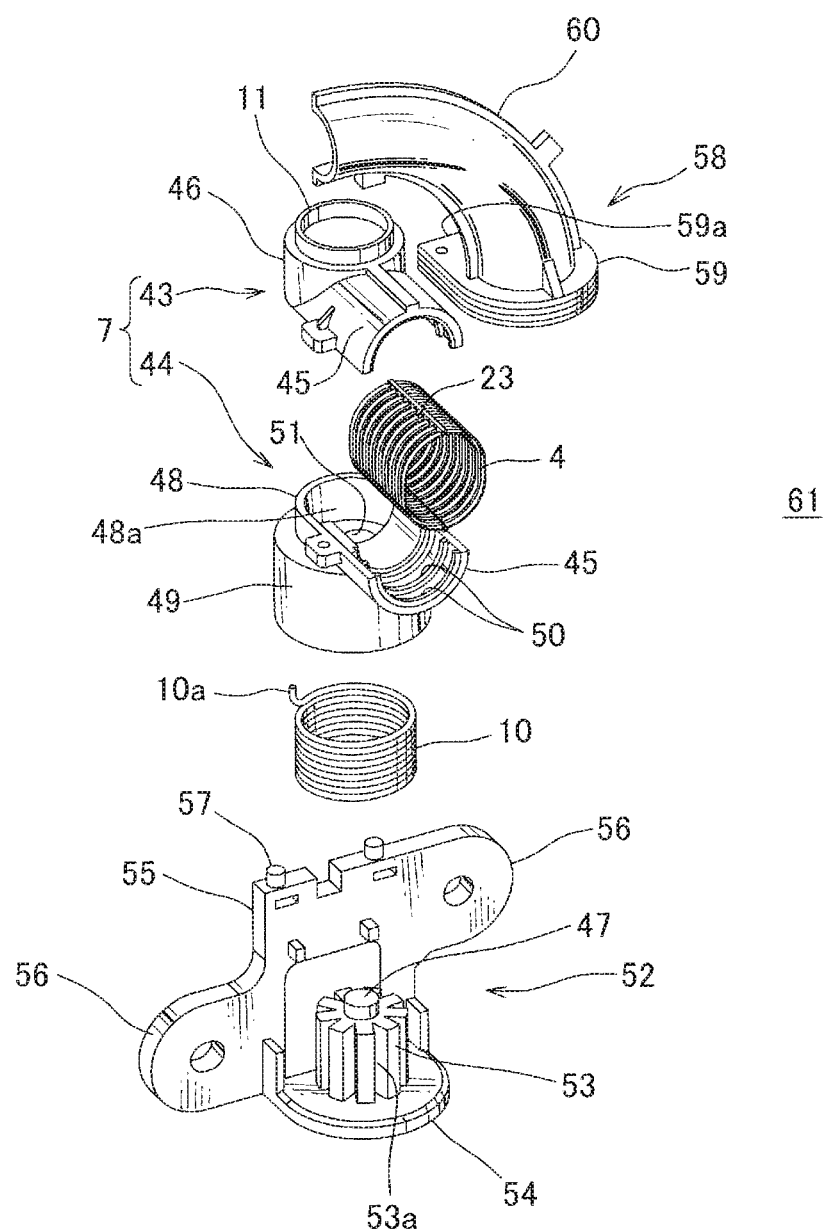
FIG. 5 is an exploded perspective view showing one example of a sliding door-side power feeding tool.

FIGS. 1 to 3 show one example of a power feeding structure for a sliding door of the present invention, and FIGS. 4 and 5 respectively show examples of a vehicle body-side power feeding tool and a sliding door-side power feeding tool used for the power feeding structure for a sliding door.

Figure 6:
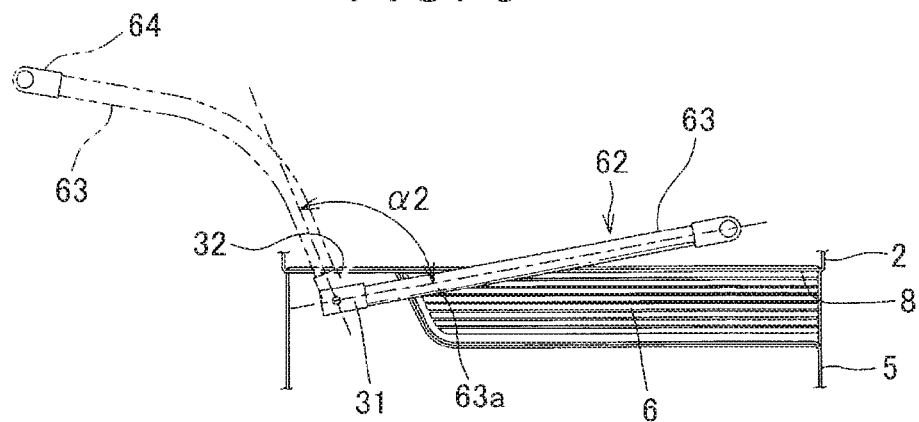
FIG. 6 is a plan view showing one example of a conventional power feeding structure for a sliding door.
Figure 7:
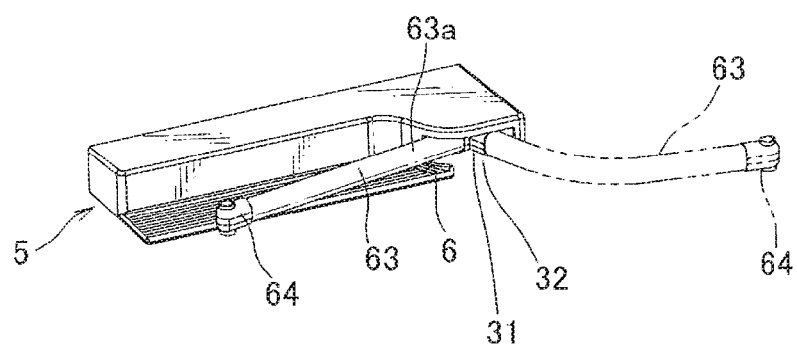
FIG. 7 is a perspective view of the conventional power feeding structure for a sliding door as viewed from outside of a vehicle.

As shown in FIG. 1, a turning angle (turning angle of a swinging member 1 from a fully closed position to a fully opened position of a sliding door 2) α1 of the swinging member 1 of a vehicle body-side power feeding tool is prescribed smaller than a turning angle α2 of a swinging member 31 of a conventional vehicle body-side power feeding tool shown in FIG. 6. The turning angle α2 of the conventional swinging member 31 shown in FIG. 6 is an obtuse angle (90° or more), and a turning angle α1 of the swinging member 1 shown in FIG. 1 is an acute angle (90° or less).

When the sliding door 2 is fully closed, i.e., when the left sliding door 2 of the vehicle is slid and moved forward of the vehicle and is fully closed, a phantom axial center line m1 of the vehicle body-side swinging member 1 diagonally extends forward at an angle (angle based on a phantom axial center line m2 in longitudinal direction of vehicle) α3 of about 50° toward the sliding door 2 (outside of vehicle) as shown on a right side in FIG. 1, and when the sliding door 2 is fully opened, a phantom axial center line m3 of the vehicle body-side swinging member 1 diagonally extends rearward at an angle (angle based on the phantom axial center line m2 in longitudinal direction of vehicle) α4 of about 115° toward the sliding door 2 (outward of vehicle) as shown on a left side in FIG. 1. The numeric values of these angles are shown as reference.

When the sliding door 2 is fully closed, a corrugated tube 4 which is an external member of a wire harness 3 and which is made of synthetic resin is pulled out forward of the vehicle at the acute angle α3 of about 50° from the vehicle body-side swinging member 1 toward the sliding door 2 (outward of vehicle), and the corrugated tube 4 projects (bypasses) toward the sliding door 2 (outward of vehicle) while avoiding a rear end 6a of the step portion 6 of the vehicle body 5 (projecting portion is shown by reference sign 4a). The corrugated tube 4 is curved with a slightly small radius (curved portion is shown by reference sign 4b) at a position opposed to the rear end 6a of the step portion 6 and is routed (portion shown by reference sign 4d) while curving with a large radius toward the step portion 6 (portion shown by reference sign 4c) along an outer end 6b of the vehicle of the step portion 6, and the corrugated tube 4 is again routed (portion shown by reference sign 4e) at a small acute angle β1 diagonally forward of the vehicle toward a sliding door-side swinging member 7.

As described above, when the sliding door 2 is fully closed, rotation of the vehicle body-side swinging member 1 is restricted, the corrugated tube 4 of the wire harness 3 enters inward of the sliding door 2 in its thickness direction (along a horizontal lower surface of a door inner panel (not shown) on an outer side of vehicle than a vertical door trim 8 of sliding door 2) between the vehicle body-side swinging member 1 and the sliding door-side swinging member 7 without being exposed to an upper side of the step portion 6, and the corrugated tube 4 is routed. According to this, the corrugated tube 4 is not seen from a passenger on the side of a passenger room 9, and visual quality is enhanced.

When the sliding door 2 is fully closed, the sliding door-side swinging member 7 is biased in a counterclockwise direction as shown by an arrow A1 by a force of a spring member 10 (FIG. 5). According to this, the sliding door-side swinging member 7 is oriented diagonally rearward toward the vehicle body 5 around a front shaft 11 as a fulcrum (center), and a corrugated tube portion 4e which is pulled out from the sliding door-side swinging member 7 extends toward the vehicle outer end 6b of the step portion 6 at the acute angle β1.

When the sliding door 2 is fully opened, i.e., when the vehicle left side sliding door 2 is slid rearward of the vehicle and is fully opened, the sliding door-side swinging member 7 (shown by chain lines) is oriented diagonally forward slightly toward the vehicle body 5 around a rear shaft 11 as a fulcrum like the conventional technique shown in FIG. 6, and the vehicle body-side swinging member 1 is oriented slightly diagonally rearward toward the sliding door 2 (outward of vehicle) around a right shaft 12 as a fulcrum like the conventional technique shown in FIG. 6.

A central portion of the corrugated tube 4 of the wire harness 3 in the longitudinal direction is curved and projected diagonally forward (curved portion is shown by reference sign 4f) between both the swinging members 1 and 7 (crossing portion), and interference between a rear end portion 13a of a step panel 13 of the vehicle body 5 and an adjacent portion thereof is prevented. The sliding door-side swinging member 7 is biased in the counterclockwise direction as shown by an arrow A2 by a force of the spring member 10 (FIG. 5). According to this, the corrugated tube 4 warps forward in an arched form when the sliding door 2 is fully opened, and prevention of interference between the rear end portion 13a of the step panel 13 of the vehicle body 5 and its adjacent portion is facilitated.

The sliding door 2 comes into intimate contact with a peripheral edge of a platform of the vehicle body 5 when the sliding door is fully closed, and the door trim 8 is located substantially on the same vertical plane as the vehicle outer end (left end) 6b of the step portion 6. The sliding door 2 opens along a vehicle body-side curved guide rail (not shown), and the sliding door 2 separates outward of the vehicle from the step portion 6 at the initial stage of the opening motion of the sliding door 2, the sliding door 2 moves rearward along an outer panel (not shown) of the vehicle body 5 and is fully opened. The sliding door 2 is manually opened and closed or by a driving operation of a motor.

As shown in FIG. 2 (FIG. 2 shows state inverted from FIG. 1 in longitudinal direction, front side of FIG. 2 is sliding door 2 side, back side is vehicle body 5 side, and left side of FIG. 2 is front side of vehicle), when the sliding door 2 is fully closed, the sliding door-side swinging member 7 is placed on the side of the sliding door 2 at a position slightly higher than the vehicle outer end 6b of the step portion 6 behind a front end 6c of the step portion 6 of the vehicle body 5 as shown by solid lines.

Figure 8:
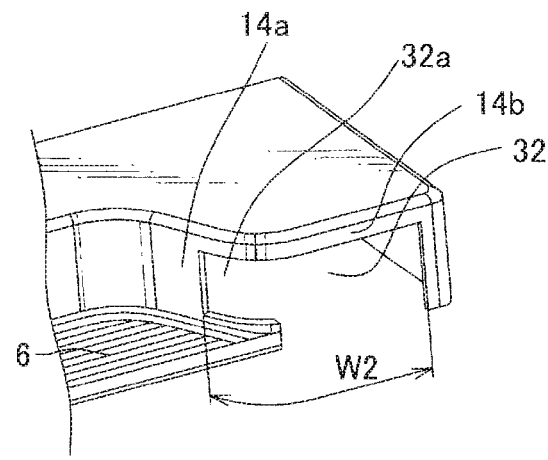
FIG. 8 is a perspective view of a conventional vehicle body-side harness pulling-out portion.

The horizontal step portion 6 continues from a vertical and upward-oriented panel wall 14 on an inner side of the vehicle, a rear end of the vertical panel wall 14 bends along a rear end of the step portion 6 (bent wall portion is shown by reference sign 14a), a wire harness pulling-out opening 16 is provided between the bent wall portion 14a and a vertical rear end wall 15 of the step panel 13 as illustrated in FIG. 3, and the opening 16 is formed narrower than the conventional opening 32 of FIG. 8 in width (width of opening 16 is shown by reference sign W1).

A front portion 32a of the conventional opening 32 shown in FIG. 8 is formed by notching the bent wall portion 14a of the rear panel, but the opening 16 shown FIGS. 2 and 3 is placed posterior to the bent wall portion 14a, and a width of the opening 16 on the side of a front portion 16a is shorted as compared with the conventional technique. An upper side of the opening 16 is closed with a horizontal panel wall 17 of the step panel 13. Since the opening 16 is formed narrow by restriction of rotation of the vehicle body-side swinging member 1 (FIG. 2), strength of the step panel 13 is enhanced, and concern that the opening 16 is seen from outside of the vehicle when the sliding door 2 is fully opened and visual quality is deteriorated is solved.

When the sliding door 2 is fully closed, the corrugated tube 4 of the wire harness 3 is pulled out forward from the vehicle body-side swinging member 1 (FIG. 2) in the opening 16 through a front half of the opening 16. As described with reference to FIG. 1, since a latter half of the corrugated tube 4 projects (projecting portion is shown by reference sign 4b) in the curved form outward of the vehicle from the opening, the inconvenience that the corrugated tube 4 is exposed to the upper side of the step portion 6 in the conventional technique shown in FIG. 6 and visual quality is deteriorated is solved.

As shown in FIG. 2, a first half of the corrugated tube 4 is reversely curved (intermediate curved portion is shown by reference sign 4d) with a large radius along the vehicle outer end 6b of the step portion 6 from the latter half curved portion 4b when the sliding door 2 is fully closed, and the first half of the corrugated tube 4 continues from the sliding door-side swinging member 7. The corrugated tube 4 is bent laterally long (long in longitudinal direction of vehicle) substantially in S shape as viewed from above when the sliding door 2 is fully closed. The sliding door-side swinging member 7 is biased in the counterclockwise direction as shown by the arrow A1 by a force of the spring member 10 (FIG. 5), and the first half curved portion 4d is formed prominently.

When the sliding door 2 is fully opened, the corrugated tube 4 is inverted in the longitudinal direction as compared with its fully closed state, and the corrugated tube 4 is pulled out in the curved formed rearward and outward of the vehicle from the latter half of the opening 16 of the step panel 13 (curved portion is shown by reference sign 4f). One of a plurality of electric wires (not shown) inserted into the corrugated tube 4 is routed inside of the vehicle body 5 through the swinging member 1 in the opening 16 of the step panel 13, and the other electric wire is routed upward on the side of the sliding door through the sliding door-side swinging member 7. The corrugated tube 4 is long circular in cross section, the corrugated tube 4 can bend in the longitudinal direction and the lateral direction of the vehicle, and bending in the vertical direction (hanging down of the crossing portion) is suppressed.

As shown on the right side (solid lines) in FIG. 1 and on the left side (solid lines) in FIG. 2, when the sliding door 2 is fully closed, the corrugated tube 4 is bent laterally long substantially in S shape, i.e., the corrugated tube 4 is bent with length margin. According to this, it is possible to smoothly absorb an increased length of the corrugated tube 4 which is increased when the corrugated tube 4 is bent in the curved form (curved portion is shown by reference sign 4f) without straightly extending the corrugated tube 4 for preventing interference of the corrugated tube 4 between the sliding door 2 and the vehicle body 5 when the sliding door 2 is fully opened, for example.

The corrugated tube 4 is bent laterally long substantially in S shape as viewed from above when the sliding door 2 is fully closed. According to this, even if a length of the corrugated tube 4 is changed (especially shortened) due to variation in a cut length of the corrugated tube 4, the shape of the curved portion 4b of at least the latter half (close to vehicle body-side swinging member 1) of the corrugated tube 4 is maintained, the corrugated tube 4 is prevented from being exposed to the upper side of the step portion 6.

In addition, by a synergistic effect with the spring member 10 of the sliding door-side power feeding tool (sliding door-side swinging member 7 is biased in counterclockwise direction as shown in arrows A1 and A2), a bending locus of the corrugated tube 4 (wire harness 3) from the fully closed state to the fully opened state and from the fully opened state to the fully closed state of the sliding door 2 becomes always the same, reverse warping of the corrugated tube 4 is not generated, the corrugated tube 4 is always smoothly bent, and bending endurance of the wire harness 3 is enhanced.

As the sliding door 2 is slightly slid rearward and opened from the fully closed state of the sliding door 2 shown in FIG. 1, the sliding door-side swinging member 7 is biased in the counterclockwise direction as shown by the arrow A1 by the force of the spring member 10 (FIG. 5) at an initial opening stage of the sliding door 2 and when the sliding door 2 half-opens. Therefore, the swinging member 7 is turned in the counterclockwise direction around the shaft 11 as a fulcrum, a harness pulling-out opening 7a of a turning tip end of the swinging member 7 is oriented toward the vehicle body 5 (inward of vehicle) and a direction of the harness pulling-out opening 7a is sequentially moved from diagonally rearward to diagonally forward, and the corrugated tube 4 of the wire harness 3 is smoothly bent substantially in reversed-S shape between the vehicle body-side swinging member 1 and the sliding door-side swinging member 7.

From this state, as the sliding door 2 moves rearward, the harness pulling-out opening 7a of the sliding door-side swinging member 7 is oriented substantially forward and the corrugated tube 4 is smoothly bent in the forward arched form from the substantially reversed-S shape as shown on the left side in FIG. 1.

In this manner, the corrugated tube 4 is bent substantially in reversed-S shape as viewed from above when the sliding door 2 is half-opened (when both swinging members 1 and 7 approach the most closely each other and length of the crossing portion between both swinging members 1 and 7 becomes the smallest) by the spring member 10 (FIG. 5) which biases the sliding door-side swinging member 7 in the counterclockwise direction and by the rotation restriction (restricted to turning angle α1) of the vehicle body-side swinging member 1. According to this, the corrugated tube 4 is prevented from being buckled or caught, bending endurance of the corrugated tube 4 is enhanced, a force required for opening and closing (especially opening) the sliding door 2 is reduced, and it is possible to smoothly open and close the sliding door 2, and to reduce the open/close motor in size.

As shown in FIG. 4, the vehicle body-side swinging member 1 is formed such that it can be divided into an upper divided swinging member 18 and a lower divided swinging member 19 both made of synthetic resin. The swinging member 1 may be called an inner member. The upper and lower divided swinging members 18 and 19 are formed vertically symmetric or substantially symmetric, and each of the swinging members 18 and 19 includes a semi-annular (semi-cylindrical) divided harness holding wall 20, and a horizontal support wall 22 which integrally continues from a base end of the divided harness holding wall 20 through a step 21.

An inner peripheral surface of each of the divided harness holding walls 20 includes ribs (convex portions) 25 which engage with recess grooves 23 of the corrugated tube 4, and a center of a disk portion 22a of an outer surface of each of the support walls 22 includes a circular boss-shaped shaft 12, and mutually fixing flange walls 26 are provided on both sides of the divided harness holding wall 20 in the width direction. Both the divided harness holding walls 20 are fixed to each other through locking means such as one locking pawl and the other locking recess of the flange wall 26 or through fixing means such as a bolt and a nut in a state where both the divided harness holding walls 20 sandwich the corrugated tube 4, and the divided harness holding walls 20 become an annular (cylindrical) harness holding wall (harness holding portion) 20.

The corrugated tube 4 made of synthetic resin is an existing tube in which the recess grooves 23 and convex portions 24 in the circumferential direction are alternately arranged in the longitudinal direction of the tube, and which is provided at its upper and lower ends with longitudinal ribs 27 for preventing bending (sag). FIGS. 4 and 5 show only a longitudinal portion of the corrugated tube 4 for the sake of convenience. A cut end 28 of the corrugated tube 4 is placed on the side of the base end of the harness holding wall 20 of the swinging member 1, and the corrugated tube 4 extends from a harness pulling-out opening 20a of a tip end of the harness holding wall 20 to the sliding door-side swinging member 7 (FIG. 5) shown in FIG. 5. A plurality of electric wires (not shown) are previously inserted into the corrugated tube 4. When the corrugated tube 4 having a circular cross section instead of the long circular cross section is used, a cross section of the harness holding wall 20 of the swinging member 1 is formed into circular.

The swinging member 1 which grasps the corrugated tube 4 is accommodated inside a cover 29 and a base 30 which are made of synthetic resin such that the swinging member 1 can swing in the horizontal direction. The cover 29 and the base 30 are upper and lower outer members (case and fixing member). The cover 29 and the base 30 are formed vertically symmetric or substantially symmetric except a vehicle body fixing bracket 33 on the side of the base 30. That is, the cover 29 and the base 30 include horizontal upper and lower base walls 34, and both side walls 35 which are integrally formed on both sides of the base walls 34 in the width direction. The cover 29 and the base 30 are fixed to each other by screwing small brackets 36 of the both side walls 35.

A tip end of each of the base walls 34 is formed into a sector shape whose width is gradually increased toward the tip end, and side walls on the both sides of a sector portion 37 is tapered or is formed into curved guide walls 38 and 39 as viewed from above. At least one of the guide walls 39 is provided at its inner surface with a rib 39a which abuts against the swinging member. An opening angle between the guide walls 38 and 39 is prescribed about 90° or less, and turning motion of the swinging member 1 can be restricted by both the guide walls 38 and 39 (turning angle of swinging member 1 can be prescribed by both guide walls 38 and 39). Outer end surfaces of the horizontal flanges 26 on both sides of the swinging member 1 abut against inner surfaces of the guide walls 38 and 39 of the outer members 29 and 30, and the turning angle of swinging member 1 is prescribed (restricted).

Inner surface of the sector portions 37 of the upper and lower base walls 34 on the base end include disk portions 37a and bearing holes (bearing portions) 40 formed in centers of the disk portions 37a. The upper and lower shafts 12 of the swinging member 1 can turnably engage with the bearing holes 40. The outer members 29 and 30 of this example are bent into substantially L shape as viewed from above, and the outer members 29 and 30 can be pulled out forward of the vehicle in the step panel 13 shown in FIG. 1 in a state where an electric wire portion (not shown) of the wire harness 3 is fixed to a fixing portion 41 of a terminal end of the base 30 by fastening by means of a band. A vehicle body-side power feeding tool (power feeding device) 42 is composed of the swinging member 1 and the outer members (fixing members) 29 and 30. It is also possible that the swinging member 1 is provided with an upper and/or lower bearing portion (40), and the outer members 29 and 30 are provided with upper and/or lower shafts (12).

As shown in FIG. 5, the sliding door-side swinging member 7 is composed of upper and lower divided swinging members (divided inner members) 43 and 44 made of synthetic resin. The upper divided swinging member 43 includes a horizontal semi-annular (semi-cylindrical) divided harness holding wall 45, a vertical annular wall 46 which is integrally formed on a base end of the divided harness holding wall 45 and which has a circular cross section, and the annular shaft 11 which is integrally formed on an upper end of the annular wall 46.

The lower divided swinging member 44 includes the divided harness holding wall 45, a curved wall 48 which is integrally provided on a base end of the divided harness holding wall 45, and an annular accommodating wall 49 which is integrally or separately provided on a lower side of the curved wall 48 and which has a circular cross section. Inner surfaces of the divided harness holding walls 45 are provided with ribs 50 which hold (engage with other end recess grooves 23) the other end of the corrugated tube 4, and a bottom wall 48a of the curved wall 48 is provided with a bearing hole (bearing portion) 51. Both the divided swinging members 43 and 44 are fixed to each other through engaging means, and both the divided harness holding walls 45 are coalesced and become an annular harness holding wall (harness holding portion) 45.

The torsion coil spring (spring member) 10 is accommodated inside of the accommodating wall 49 of the lower divided swinging member 44, a catching portion 10a on an upper end of the torsion coil spring 10 is locked on the side of an upper portion of the accommodating wall 49, and a catching portion (not shown) on a lower end is locked to a boss 53 of a bottom of a base (outer member or fixing member) 52 made of synthetic resin. The swinging member 7 is biased in the counterclockwise direction (leftward in FIG. 5) by a force of the torsion coil spring 10.

The base 52 includes a horizontal bottom wall 54, a back wall 55 vertically standing on the side of a base end of the bottom wall 54, the boss 53 standing on a substantially central portion of the bottom wall 54 and having a plurality of vertical grooves 53a, a short cylindrical shaft 47 provided on a central portion of an upper portion of the boss 53, door fixing brackets 56 provided on both sides of the back wall 55, and a cover fixing projection 57 provided on an upper end of the back wall 55. An inner peripheral surface of a torsion coil spring 19 is placed along an outer peripheral surface of the boss 53, and the shaft 47 engages with the bearing hole 51 of the lower divided swinging member 44. The bracket 56 is fixed to a door inner panel of the sliding door 2 (FIG. 1) by fastening by means of a band.

An upper cover (outer member or fixing member) 58 includes a lower flange wall 59 and a halved harness pulling-out wall 60 which projects from the flange wall 59 upward in a curved shape. The flange wall 59 is provided with a bearing hole (not shown) with which the annular shaft 11 of the upper divided swinging member 43 engages, and the bearing hole is in communication with an inner space of the harness pulling-out wall 60. A base end 59a of the flange wall 59 is strongly fixed to the projection 57 on the side of the upper end of the base 52 through welding. An outer surface of a side of the harness holding wall 45 of the swinging member 7 abuts against the brackets 56 on both sides of the back wall 55, for example, and a turning angle of the swinging member 7 is prescribed. A sliding door-side power feeding tool (power feeding device) 61 is composed of the swinging member 7, the torsion coil spring 10, the base 52 and the cover 58. Shapes and arrangement of the upper and lower shafts 11 and 47 and the bearing 51 can appropriately be changed.

Although the corrugated tube 4 is used as the harness exterior member of the wire harness 3 in this example, it is also possible to use a harness protection tube other than the corrugated tube 4, and other caterpillar-shaped harness protection members. One end and the other end of the harness external member are held by and fixed to the vehicle body-side and sliding door-side swinging members 1 and 7. It is also possible to route a plurality of electric wires as the wire harness 3 in a state where the electric wires are banded by a tape without using the harness protection members. In this case, one ends and the other ends of the plurality of electric wires are fixed to the swinging members 1 and 7 by tape winding.

Further, in this example, the sliding door 2 can be called a slide structure body, and the vehicle body 5 can be called a fixing structure body. For example, the slide structure body may exist in a vehicle other than a car, or in a device other than the vehicle.

INDUSTRIAL APPLICABILITY

The power feeding structure for a sliding door according to the present invention eliminates deterioration of visual quality caused by exposure of a vehicle body-side wire harness when the sliding door is fully closed, and the power feeding structure can be utilized for making it possible to smoothly bend the wire harness when the sliding door is half opened from its fully closed state.

REFERENCE SIGN LIST 1 vehicle body-side swinging member
2 sliding door
3 wire harness
4a projection
4b curved portion
5 vehicle body
6 step portion
7 sliding door-side swinging member
10 torsion coil spring (spring member)
16 opening
α1 turning angle

The invention claimed is:

1. A power feeding structure for a sliding door, comprising:
   a wire harness;
   a vehicle body-side swinging member placed near a rear portion of a vehicle body-side step portion; and
   a sliding door-side swinging member, the wire harness being routed from the vehicle body-side swinging member to the sliding door-side swinging member through an opening behind the step portion, wherein
   a forward turning angle of the vehicle body-side swinging member is restricted so that the wire harness forms a projection which projects from the vehicle body-side swinging member toward an outer side of the vehicle more than the step portion and a curved portion which projects in a convex form outward of the vehicle, and the wire harness curves toward an inner side of the vehicle following the curved portion when the sliding door is slid forward of a vehicle and is fully closed.

2. The power feeding structure for a sliding door according to claim 1, wherein when the sliding door is fully closed, the sliding door-side swinging member is biased inward of the vehicle by a spring member.

3. The power feeding structure for a sliding door according to claim 2, wherein when the sliding door is fully closed, the wire harness is bent substantially in S shape between the vehicle body-side swinging member and the sliding door-side swinging member.

* * * * *